Aug. 4, 1964 A. G. BODINE 3,142,901
METHOD OF MAKING SHAFT JOINT UTILIZING GYRATORY VIBRATIONS
Original Filed Aug. 19, 1957
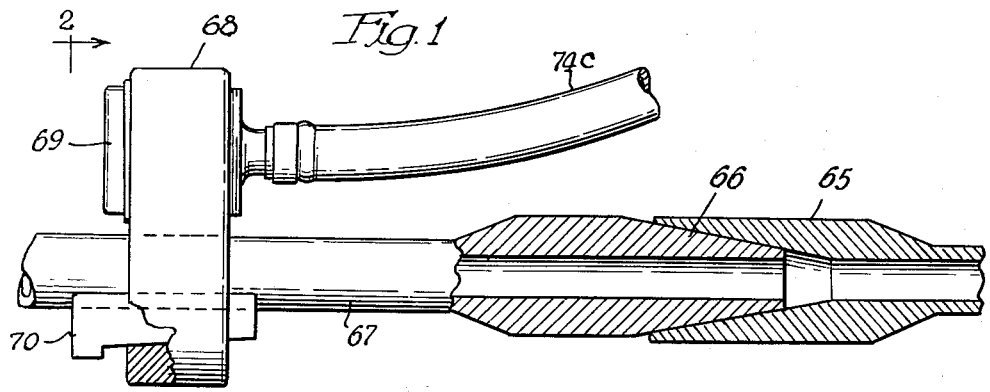
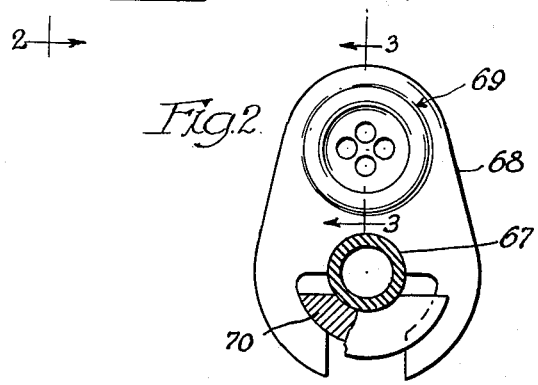
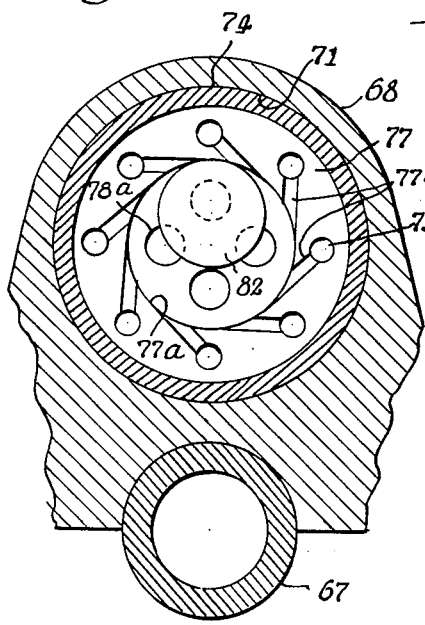
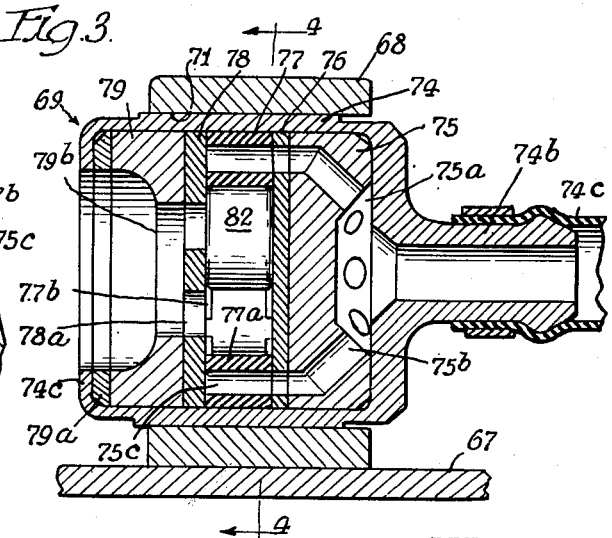
INVENTOR.
Albert G. Bodine
BY
Attorney 3,142,901
METHOD OF MAKING SHAFT JOINT UTILIZING GYRATORY VIBRATIONS
Albert G. Bodine, Sherman Oaks, Calif.
(7877 Woodley Ave., Van Nuys, Calif.)
Original application Aug. 19, 1957, Ser. No. 678,905, now Patent No. 3,063,143, dated Nov. 13, 1962. Divided and this application Mar. 16, 1962, Ser. No. 180,286
2 Claims. (Cl. 29—525)

This invention is concerned with a method of making threadless joints for long transmission shafting, such as, but not limited to, joints employed in oil well drilling string. The invention is also applicable to other types of shafting such as long transmission shafts employed in factories and mines for delivering rotating power to various machines.

Most shaft joints employ some type of screw thread, typically in the form of a single large thread like a pipe thread. Thus, in a so-called drill pipe tool joint, a taper threaded "pin" is screwed into a taper threaded socket or "box." As a second familiar example, may be mentioned shaft flanges secured by nuts and bolts. Threaded structures, however, are very fatigue sensitive, especially if the threads are subject to wear owing to repeated making and unmaking of the joint.

A primary object of the present invention is accordingly the provision of a novel and improved method of making a threadless taper shaft joint.

Broadly speaking, the invention is of that class of making box and pin joints by employing methods of swelling momentarily the box or socket member of the joint while the pin member is inserted or removed therefrom, and a more particular object of the invention is to accomplish this result without resort to heating, but by application of vibratory forces.

These objects are attained, in the present invention, by elastic expansion of the tapered box member through application of gyratory sonic vibrations to the correspondingly tapered pin member, and at the same time forcing the pin member into the box member. The box member is elastically expanded within its elastic limit; and when the sonic vibrations are terminated, the box member elastically contracts and becomes very tightly bound to the pin member. The elastic expansion and subsequent contraction brought about by the gyratory type vibration, combined with the wedging action of the tapered pin forced into its tapered box, results in the interengaged surfaces of the pin and box becoming virtually welded to one another by a molecular interlocking of these surfaces.

Reference is directed to the accompanying drawings showing a present preferred embodiment of the invention, and wherein:

FIG. 1 is a side elevation, with parts broken away to show a longitudinal medial section, of an illustrative form of the invention;

FIG. 2 is a section taken on line 2—2 of FIG. 1;

FIG. 3 is a section taken on line 3—3 of FIG. 2; and

FIG. 4 is a transverse section taken on line 4—4 of FIG. 3.

A tapered box coupling element is designated generally at 65, and a tapered pin coupling element at 66. Pin coupling element is shown to be on the end of a hollow shaft or pipe 67. Fixed tightly on this hollow shaft or pipe 67 is a clamp device 68 mounting a gyratory vibration generator generally designated by the numeral 69. The clamp member 68 is firmly engaged with the shaft or pipe 67, for instance, by the use of a wedge-shaped key 70, as clearly illustrated in FIGS. 1 and 2.

The vibration generator 69 is press-fitted inside a bore 71 in member 68. It includes cylindrical housing 74 whose end wall 74a is provided with nipple 74b, to which is attached compressed air supply hose 74c. Mounted inside housing 74 are a series of plates, an air inlet plate 75 immediately adjacent wall 74a, a wear plate 76, a raceway plate 77, a second wear plate 78, and finally an end plate 79, these plates being backed up by a washer 79a, in back of which is a flange 74c formed by spinning over the end portion of housing 74. Raceway plate 77 is centrally bored to form annular raceway 77a, and contained within the member defined by this raceway is a cylindrical inertia roller 82, it being noted that the said chamber is defined at the sides by the two plates 76 and 78. In the present case, the diameter of the roller 82 is a little over half that of the diameter of the raceway 77a, as appears in FIG. 4.

Air under pressure entering through nipple 74b is received initially in a chamber 75a at the front side of plate 75, and flows from there via a plurality of divergent passageways 75b to a corresponding plurality of passageways 75c which extend parallel to the axis of housing 74 from the outer ends of passageways 75b through plates 76 and 77, to terminate at the adjacent face of plate 78. This air in passageways 75c is discharged into the rotor chamber via nozzle grooves 77b cut in opposed faces of plate 77 and leading from passageways 75c to the annular raceway 77a, opening into the latter in a tangential direction. The tangentially induced air causes the roller 82 to spin about the raceway 77a, and to exert a gyratory force on the generator casing 74, and therefore on the clamp members 68, and on the hollow shaft or pipe 67, to which the clamp is firmly fixed. Spent air is discharged to atmosphere through ports 78a in the central portion of plates 78, and central opening 79b in air exhaust plate 79.

The gyratory force exerted by the inertia roller on the casing 74 results in the latter, as well as the clamp 68, shaft 67, and coupling pin 66, moving bodily in a small circle. The coupling pin 66, moving in this fashion, works circularly around the inside of the coupling box 65, elastically expanding it progressively about its circumference. By adjusting the frequency of the inertia roller, the pin and/or box can be made to resonate, thereby amplifying the elastic deformation movements. It will be noted that the greatest stress will be in the outer periphery of the box, diminishing inwardly. During this action, the pin and box coupling members are forced together, by any suitable means, not shown; and owing to the gyratory elastic expansion of the box member, the pin can readily be forced into it to a depth such that, when the gyratory action is terminated, the box elastically contracts and seizes very tightly onto the pin. In some cases a virtual weld is obtained between the pin and box. This appears to come about not by heating and resulting plastic flow, but by the gyrational vibration and the ensuing elastic expansion and contraction, in combination with the wedging action of the tapered pin and box members, with the result of a surface molecular interlock between the pin and box surfaces.

The pin may be removed from the box by using the same gyratory action, which loosens or breaks the hold of the box member on the pin, so that the pin can be gradually extracted.

This application is a division of my parent application Serial No. 678,905, filed August 19, 1957, now Patent No. 3,063,143, entitled Shaft Joining Method and Apparatus.

I claim:
1. The method of coupling the tapered pin and box members of a threadless taper pin and box shaft joint, that comprises: introducing the pin member into the box member, elastically expanding said box member by imparting bodily gyratory motion to one of said members relatively to the other of said members, simultaneously therewith forcing said members together, and terminating the gyrational motion to permit the box member to elastically contract into firm engagement with said pin member.

2. The method of coupling the tapered pin and box members of a threadless taper pin and box shaft joint, that comprises: introducing the pin member into the box member, elastically expanding said box member by imparting bodily gyratory motion to said pin member relative to said box member, simultaneously therewith forcing said members together, and terminating the gyrational motion to permit the box member to elastically contract into firm engagement with said pin member.

References Cited in the file of this patent

UNITED STATES PATENTS

| | | |
|---|---|---|
| 1,057,159 | Madsen | Mar. 25, 1913 |
| 2,086,667 | Fletcher | July 13, 1937 |
| 2,404,515 | Meyer | July 23, 1946 |
| 2,438,206 | Day | Mar. 23, 1948 |
| 2,438,867 | Rockwell et al. | Mar. 30, 1948 |
| 2,671,949 | Welton | Mar. 16, 1954 |
| 2,730,176 | Herbold | Jan. 10, 1956 |
| 2,948,059 | Bodine | Aug. 9, 1960 |